United States Patent
Ito et al.

(10) Patent No.: US 10,267,272 B2
(45) Date of Patent: Apr. 23, 2019

(54) INTAKE APPARATUS AND INTAKE FLOW CONTROL VALVE OF INTERNAL COMBUSTION ENGINE

(71) Applicant: AISIN SEIKI KABUSHIKI KAISHA, Kariya-shi, Aichi-ken (JP)

(72) Inventors: Atsushi Ito, Anjo (JP); Koji Moriguchi, Anjo (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 21 days.

(21) Appl. No.: 15/348,511

(22) Filed: Nov. 10, 2016

(65) Prior Publication Data

US 2017/0152819 A1    Jun. 1, 2017

(30) Foreign Application Priority Data

Nov. 11, 2015  (JP) .................... 2015-221146

(51) Int. Cl.
    *F02M 35/10*    (2006.01)
(52) U.S. Cl.
    CPC ........... *F02M 35/10262* (2013.01); *F02M 35/10255* (2013.01); *Y02T 10/146* (2013.01)
(58) Field of Classification Search
    CPC combination set(s) only.
    See application file for complete search history.

(56) References Cited

U.S. PATENT DOCUMENTS

2009/0272356 A1  11/2009  Abe et al.
2010/0037853 A1   2/2010  Tsuchiya et al.

FOREIGN PATENT DOCUMENTS

| JP | 06173695 A | * | 6/1994 |
| JP | 4485541 B | | 4/2010 |
| JP | 2010-190166 A | | 9/2010 |
| JP | 4591506 B | | 9/2010 |

OTHER PUBLICATIONS

English Translation of JP06173695A PDF File Name: "JP06173695A_Machine_Translation.pdf".*

* cited by examiner

*Primary Examiner* — Lindsay Low
*Assistant Examiner* — Ruben Picon-Feliciano
(74) *Attorney, Agent, or Firm* — Buchanan Ingersoll & Rooney PC

(57) ABSTRACT

An intake apparatus of an internal combustion engine includes: an intake passage configured to communicate with a combustion chamber of an internal combustion engine having two intake valves per cylinder and supply intake air to the combustion chamber; and an intake flow control valve installed in the intake passage and configured to control a flow of intake air by an opening formed between a valve body and an inner surface of the intake passage when the valve is closed as the valve body is rotated, in which, when the intake flow control valve is closed, an opening length of the opening, which is formed on an end side in an arrangement direction of the two intake valves in a direction orthogonal to the arrangement direction and an intake air flow direction, is longer than an opening length of the opening, which is formed at a central portion of the intake flow control valve in the arrangement direction in the direction orthogonal to the arrangement direction and the intake air flow direction.

6 Claims, 8 Drawing Sheets

[FIG.1]
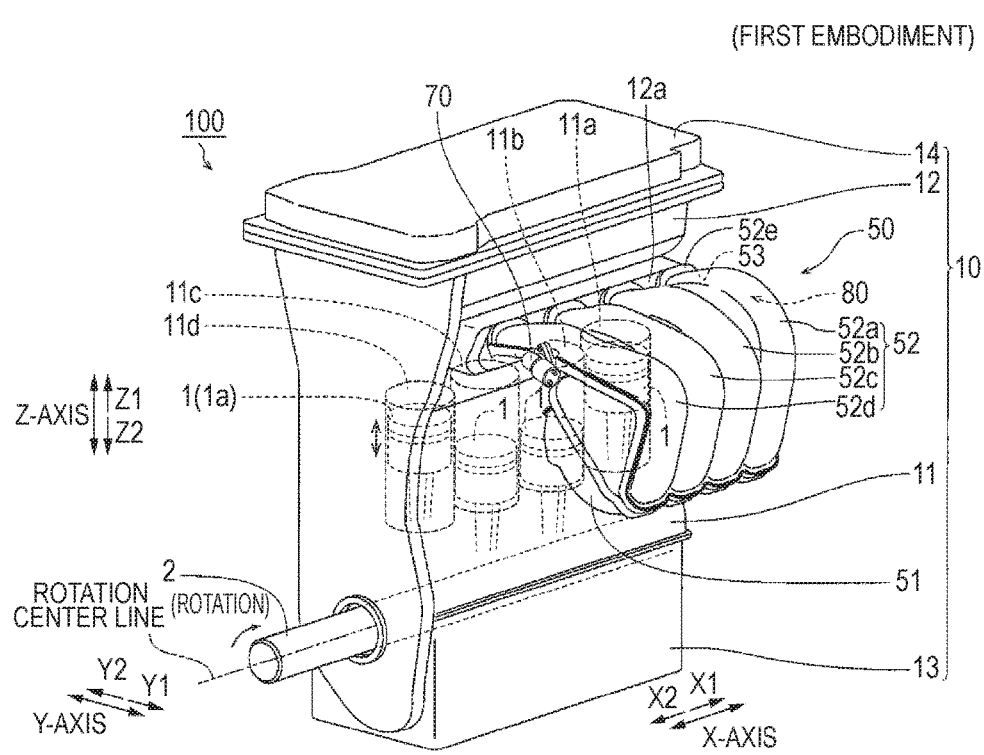

[FIG.2]
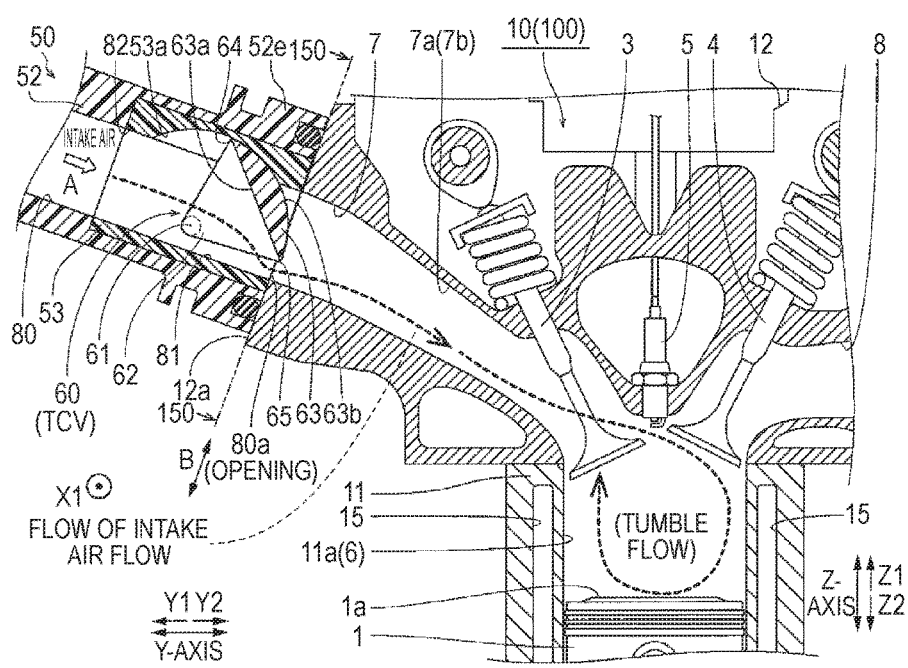

[FIG.3]
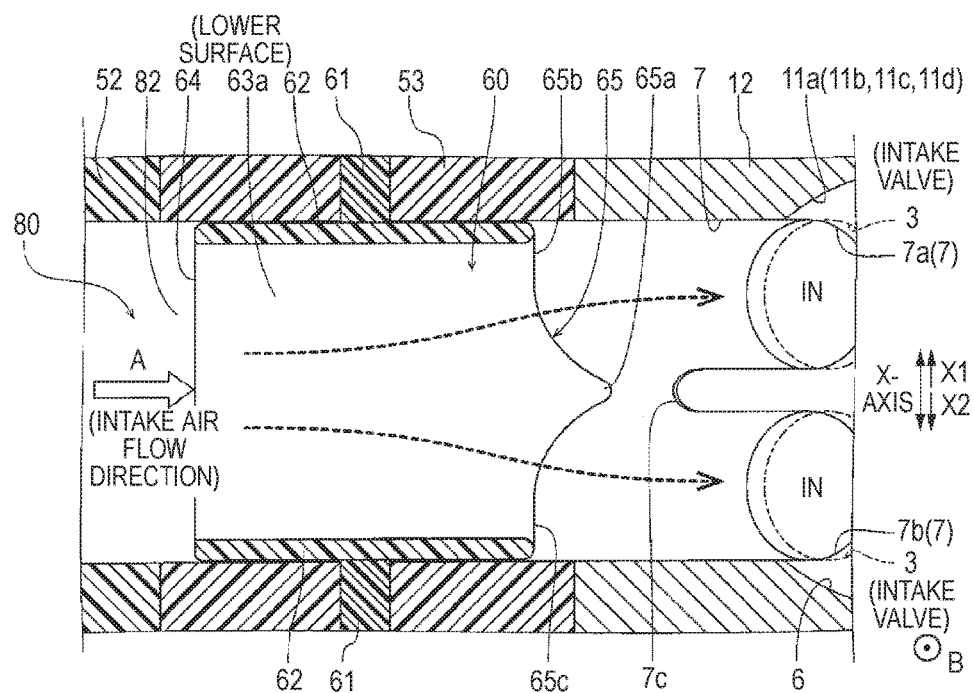

[FIG.4]
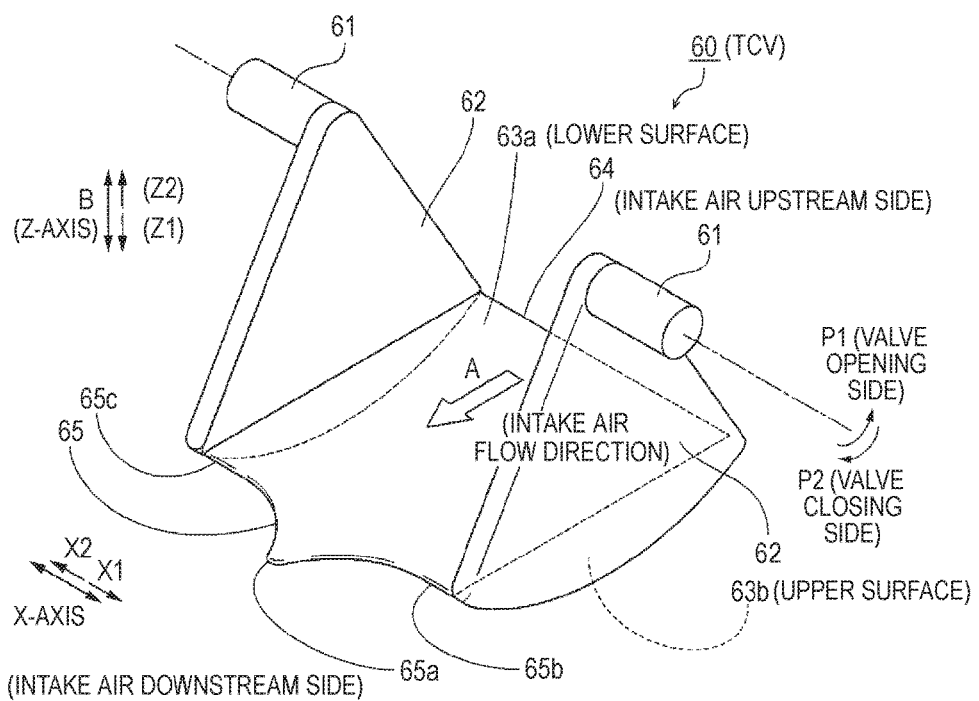

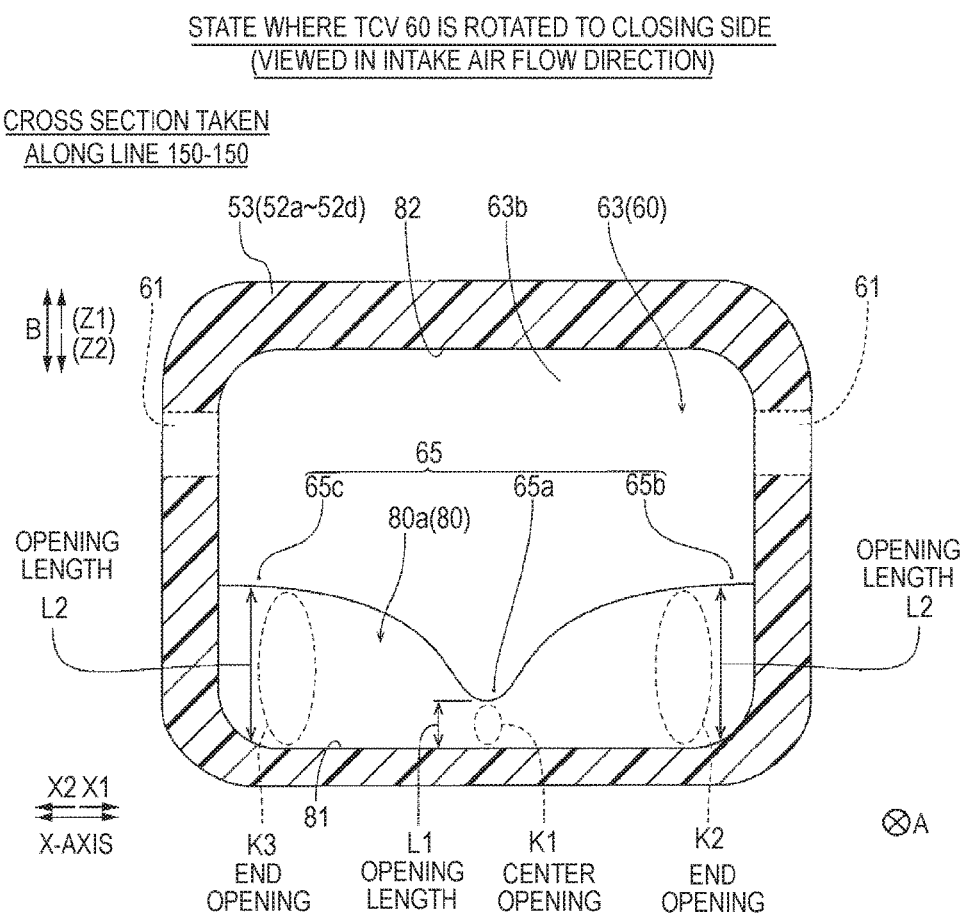

[FIG.6]
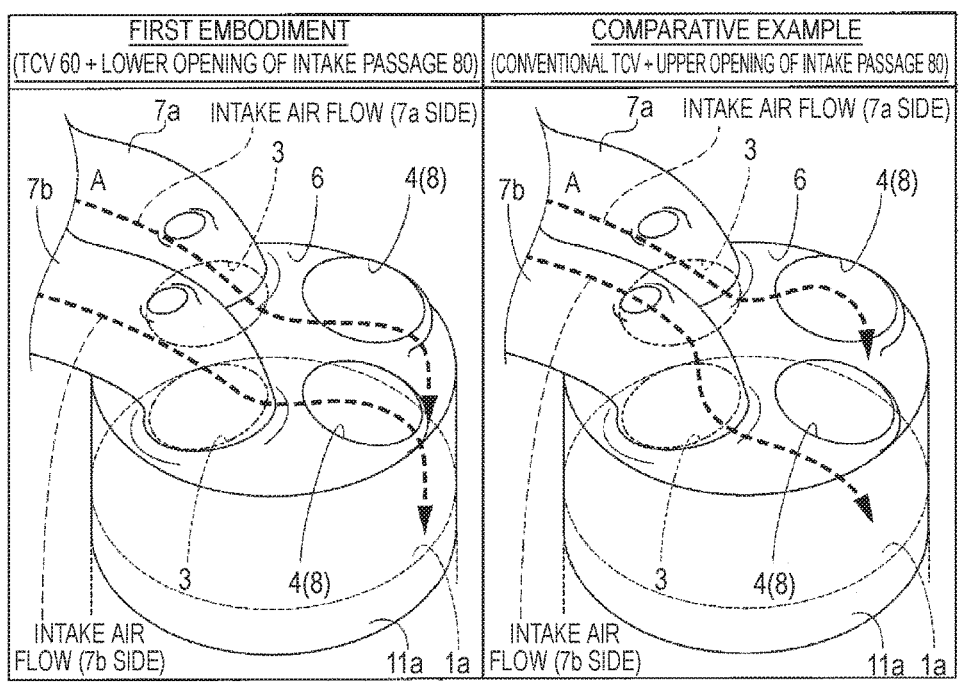

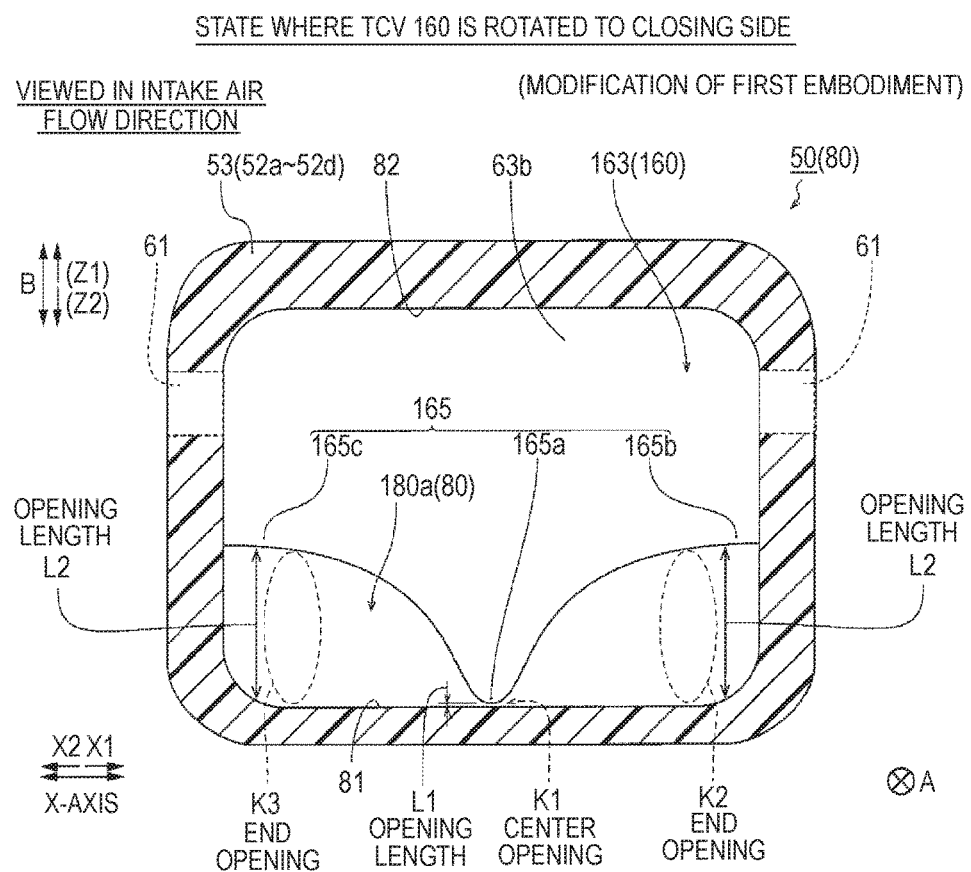

[FIG.8]
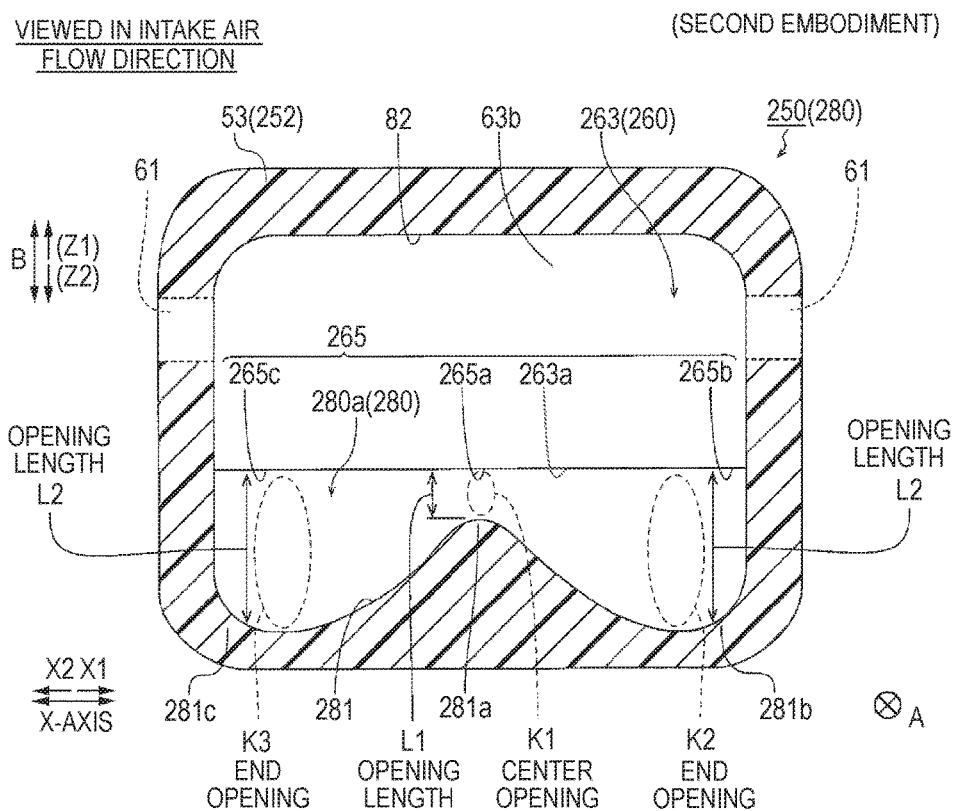

INTAKE APPARATUS AND INTAKE FLOW CONTROL VALVE OF INTERNAL COMBUSTION ENGINE

CROSS REFERENCE TO RELATED APPLICATIONS

This application is based on and claims priority under 35 U.S.C. § 119 to Japanese Patent Application 2015-221146, filed on Nov. 11, 2015, the entire contents of which are incorporated herein by reference.

TECHNICAL FIELD

This disclosure relates to an intake apparatus of an internal combustion engine and an intake flow control valve, and more particularly, to an intake apparatus of an internal combustion engine, which includes two intake valves per cylinder, and an intake flow control valve.

BACKGROUND ART

An intake apparatus of an internal combustion engine, which includes two intake valves per cylinder, has been known in the related art (e.g., see Japanese Patent No. 4485541 (hereinafter referred to as "Reference 1").

Reference 1 discloses an intake manifold connected to an internal combustion engine (an intake apparatus of an internal combustion engine), which includes a pair of (two) intake valves in each cylinder. In the intake manifold disclosed in Reference 1, an intake flow control valve, which controls the flow of intake air, is installed in an intake passage so as to open or close the intake passage. In addition, the intake flow control valve includes a rotating shaft that is installed at the lower end of a flat plate-like valve body (the upstream end of intake air), which includes a flat blade surface, and is accommodated in a recess formed in the lower inner surface of the intake passage when the valve is opened. In addition, when the valve body is rotated to the closing side so as to obliquely rise from the recess, the downstream side tip end of the valve body reduces the cross section of the intake passage, which causes a downstream intake air flow to be deflected such that a tumble flow (a longitudinal vortex) is generated within the cylinder. In addition, one intake passage diverges into two intake passages at a portion of a downstream side head port (i.e., a portion of an intake port inside a cylinder head) downstream of the intake flow control valve, and then communicates with the inside of the cylinder through the intake ports, which are opened or closed by the intake valves, respectively.

In the intake manifold of Reference 1, it is considered that a certain degree of tumble flow may be generated inside the cylinder because the valve body having a flat plate shape is rotated to the closing side so that the downstream side tip end thereof reduces the cross section of the intake passage. However, in the case where one intake passage diverges into two intake passages at a portion of the head port (i.e., a portion of the intake port inside the cylinder head) downstream of the intake flow control valve, it is considered that the stream line of the deflected intake air flow may be hard to form a shape that is capable of generating a strong tumble flow within the cylinder due to the shape of the inner surface of the diverging portion and the intake port downstream of the diverging portion. Therefore, the internal combustion engine, which is provided with a head port (i.e. the intake port) including two intake valves per cylinder has a problem in that it cannot obtain a sufficient strength of the tumble flow generated within the cylinder.

Therefore, a demand exists for an intake apparatus of an internal combustion engine and an intake flow control valve, which do not have the above-described disadvantages.

SUMMARY

An intake apparatus of an internal combustion engine according to a first aspect disclosed here is configured to include an intake passage, which communicates with a combustion chamber of an internal combustion engine having two intake valves per cylinder and supplies intake air to the combustion chamber, and an intake flow control valve, which is installed in the intake passage and controls a flow of intake air by an opening that is formed between a valve body and an inner surface of the intake passage via rotation of the valve body when the valve is closed, in which, when the intake flow control valve is closed, an opening length of the opening, which is formed on an end side in an arrangement direction of the two intake valves in a direction orthogonal to the arrangement direction and an intake air flow direction, is longer than an opening length of the opening, which is formed in a central portion of the intake flow control valve in the arrangement direction in the direction orthogonal to the arrangement direction and the intake air flow direction.

An intake flow control valve according to a second aspect disclosed here is configured to include: a valve body, which is installed in an intake passage that supplies intake air to a combustion chamber of an internal combustion engine having two intake valves per cylinder and controls a flow of intake air by forming an opening between the valve body and an inner surface of the intake passage; and a rotating shaft that rotates the valve body in the intake passage, in which, in a lower outer circumferential portion of the valve body, an outer circumferential portion of a central portion of the valve body in an arrangement direction of the two intake valves protrudes toward a lower inner surface of the intake passage more than an outer circumferential portion of an end portion in the arrangement direction, so that, when the valve is closed, an opening length of the opening, which is formed on an end side in the arrangement direction in a direction orthogonal to the arrangement direction and an intake air flow direction, is longer than an opening length of the opening, which is formed in the central portion in the arrangement direction in the direction orthogonal to the arrangement direction and the intake air flow direction.

BRIEF DESCRIPTION OF THE DRAWINGS

FIG. 1 is a perspective view illustrating a schematic configuration of an engine according to a first embodiment disclosed here.

FIG. 2 is a sectional view illustrating a structure of the engine and an intake apparatus according to the first embodiment disclosed here.

FIG. 3 is a bottom view illustrating a structure around a TCV (an intake flow control valve) according to the first embodiment disclosed here.

FIG. 4 is a perspective view illustrating a structure in a unit of the TCV according to the first embodiment disclosed here.

FIG. 5 is a view illustrating a cross-sectional shape of an intake passage in the state where the TCV according to the first embodiment disclosed here is rotated to the closing side.

FIG. 6 is a view for explaining effects obtained when the TCV according to the first embodiment disclosed here is applied.

FIG. 7 is a view illustrating a cross-sectional shape of the intake passage in the state where a TCV according to a modification of the first embodiment disclosed here is rotated to the closing side.

FIG. 8 is a view illustrating a cross-sectional shape of the intake passage in the state where a TCV according to a second embodiment disclosed here is rotated to the closing side.

DETAILED DESCRIPTION

Hereinafter, embodiments disclosed here will be described based on the drawings.

[First Embodiment]

First, a configuration of an intake apparatus (an intake apparatus of an internal combustion engine) 50, which is mounted in an engine (an example of the internal combustion engine) 100 according to a first embodiment of this disclosure, will be described with reference to FIGS. 1 to 6.

(Schematic Configuration of Engine)

The engine 100 (an example of the internal combustion engine) for a vehicle (automobile) according to the first embodiment disclosed here includes an engine main body 10, as illustrated in FIG. 1. The engine main body 10 includes a cylinder block 11, a cylinder head 12 fastened to the upper surface (Z1 side) of the cylinder block 11, a crank case 13 fastened to the lower surface (Z2 side) of the cylinder block 11, and a head cover 14 fastened to the top of the cylinder head 12 to cover the top of the cylinder head 12. In addition, the engine 100, which is of a serial four-cylinder type, rotates a crank shaft 2 by successively repeating a cycle of suction, compression, expansion (combustion), and exhaust as pistons 1 are reciprocally moved respectively within four cylinders 11a to 11d that extend in the vertical direction (Z-axis direction). In addition, the crank shaft 2 extends in the arrangement direction of the cylinders 11a to 11d (X-axis direction).

As illustrated in FIG. 2, an intake valve 3 and an exhaust valve 4, which are periodically opened or closed by the rotation of a cam shaft (not illustrated), and an ignition plug 5 are inserted into the cylinder head 12. In addition, the cylinder head 12, which is formed of an aluminum alloy, includes a combustion chamber 6, an intake port 7 that sends intake air (suctioned air) to the combustion chamber 6, and an exhaust port 8 from which burned gas is discharged. In addition, the intake port 7, the combustion chamber 6, and the exhaust port 8 are arranged in the cylinder head 12 to respectively correspond to the cylinders 11a to 11d of the cylinder block 11 (see FIG. 1).

In addition, as illustrated in FIG. 3, each of the cylinders 11a to 11d includes two intake valves 3 and two exhaust valves 4 (see FIG. 2). Thus, the intake port 7 within the cylinder head 12 diverges from a single port state at the intake upstream side into a two port state at the intake downstream side in which the intake port 7 diverges into a first port 7a that is opened or closed by one intake valve 3 and a second port 7b that is opened or closed by the other intake valve 3 to extend toward the cylinder 11a (the combustion chamber 6). In addition, the intake port 7 is provided with a diverging wall 7c that separates the first port 7a and the second port 7b from each other, and the first port 7a and the second port 7b diverge bilaterally symmetrically from the center of the X-axis direction of the intake port 7. In addition, in FIG. 3, the arrangement direction of the two intake valves 3 corresponds to the X-axis direction (an example of the arrangement direction of the two intake valves).

The cylinder block 11 and the cylinder head 12 are provided with a water jacket 15, through which cooling water circulates. The engine 100 includes a cooling water pump (not illustrated), and the cooling water in the radiator (not illustrated) is supplied to the water jacket 15 via the cooling water pump.

In addition, as illustrated in FIG. 1, the engine 100 includes the intake apparatus 50 connected to the cylinder head 12. In addition, the intake apparatus 50 includes a surge tank 51 and an intake pipe unit 52 formed of a resin and connected to the downstream side of the surge tank, and an intake passage 80 is defined in the intake apparatus 50.

The intake pipe unit 52 includes intake pipes 52a to 52d, which are arranged along the arrangement direction of the cylinders 11a to 11d (the X-axis direction), and serves to distribute intake air accumulated in the surge tank 51 to the corresponding suction port 7 (see FIG. 2) through the intake pipes 52a to 52d. In addition, the intake pipe unit 52 is connected to a side surface 12a of the cylinder head 12 via a flange portion 52e that is integrally formed at the downstream end thereof. In addition, a frame member 53 (see FIG. 2), which is formed of a resin, is coaxially fitted to the inside of the flange portion 52e, and a tumble control valve (TCV) 60 (an example of an intake flow control valve) is rotatably installed in the frame member 53 to control the flow of intake air (the degree of deflection). In addition, the frame member 53 includes a valve body accommodating portion 53a that is concavely recessed in a portion of an upper inner surface 82, and the TCV 60 is accommodated in the valve body accommodating portion 53a to be fully opened (to achieve the maximum cross-sectional area of a flow path). In addition, as illustrated in FIG. 5, each of the intake pipes 52a to 52d has a flow path, the cross-sectional shape of which is horizontally elongated along the X-axis direction. In addition, four corners of the intake passage 80 are rounded (to form arc-shaped portions).

Here, as illustrated in FIG. 2, the upper inner surface 82 represents the Z1 side inner surface of each of the intake pipes 52a to 52d. In the state where the TCV 60 is accommodated in the valve body accommodating portion 53a (see FIG. 3), the upper inner surface 82 of the intake passage 80 and a lower surface 63a of the TCV 60 (the lower surface of the valve body) (to be described later) form the same surface, thus configuring a smooth inner surface having, for example, no convex and concave portions. In addition, an actuator 70 that drives the TCV 60 is inserted into the intake apparatus 50. Further, the actuator 70 is attached to the X2 side outer surface of the intake pipe unit 52 and is connected to a rotating shaft 61 of the TCV 60 (see FIG. 3) via a drive mechanism (not illustrated).

The intake apparatus 50 is configured to control the opening area (the cross-sectional area of a flow path) of the intake passage 80 inside each of the intake pipes 52a to 52d by operating four (4) TCVs 60 using the actuator 70 when performing an intake operation in each of the cylinders 11a to 11d. In the engine 100, the opening degree of the TCV 60 is checked by an ECU (control unit) (not illustrated). In addition, as the actuator 70 is driven based on the information regarding the opening degree of the TCV 60, the attitude control of the TCV 60 is performed so as to achieve an optimum opening degree according to the operating state (load state) of the engine 100.

That is, in the intake apparatus 50, as the TCV 60 is rotated (opened or closed), the cross-sectional area of the flow path of the intake passage 80 is controlled to imparts a predetermined air flow shape to the intake air supplied to the combustion chamber 6. In the engine 100, a tumble flow (longitudinal vortex) is generated in the combustion chamber 6 within a predetermined rotation speed zone (load state). In addition, by controlling the tumble flow in the combustion chamber 6, the efficiency of combustion of mixed air is enhanced, thereby improving exhaust gas components including nitrogen oxide. Accordingly, the rotation (opening or closing) operation of the TCV 60 is controlled according to the operating state of the engine 100 (the revolutions per minute and the load state). Hereinafter, a detailed configuration of the TCV 60 will be described.

(Detailed Configuration of TCV (Intake Air Flow Control Valve))

The TCV 60 is formed of a resin material that is excellent in heat resistance. As illustrated in FIG. 4, the TCV 60 includes the rotating shafts 61 that are installed at the X1 side and the X2 side, respectively, and extend in the X-axis direction, a pair of support portions 62, each of which extends in a fan shape from one of the rotating shafts 61, and a valve body 63 that interconnects ends of the support portions 62 at the opposite side to the rotating shafts 61 (the radial outside) in the horizontal direction (the X-axis direction). In addition, the rotating shafts 61 are rotatably assembled to the frame member 53. Accordingly, the TCV 60 has a U-shaped cross-sectional shape when viewed along the intake air flow direction (the direction of arrow A). In addition, FIG. 4 illustrates the TCV 60 by reversing, in the vertical direction (approximately in the Z-axis direction), the state where the TCV 60 is actually operated in the intake pipe unit 52.

In addition, the valve body 63 includes the flat lower surface 63a (the Z2 side), and an arc-shaped upper surface 63b (the Z1 side) in order to rotate the valve body 63 about the rotating shafts 61 in the direction of arrow P1 or arrow P2 within the intake passage 80. The upper surface 63b schematically extends in the arc shape (protruding toward the Z1 side) along the direction of arrow A. In addition, as illustrated in FIG. 3, the extension direction of the rotating shafts 61 coincides with the X-axis direction that is the arrangement direction of the two intake valves 3 (the arrangement direction of the first port 7a and the second port 7b). In addition, as the actuator 70 (see FIG. 1) is operated, the valve body 63 is configured to be steplessly controlled to any attitude between the fully opened state illustrated in FIG. 3 and the fully closed state (attitude controlled state) illustrated in FIGS. 2 and 5.

Here, in the first embodiment, while the lower surface 63a (the Z2 side) of the valve body 63 includes an upstream side edge portion 64, which linearly extends in the X-axis direction, at the upstream end thereof in the intake air flow direction (the direction of arrow A), in the lower outer circumferential portion 65 in the direction of arrow A, an outer circumferential central portion 65a in the X-axis direction that is the arrangement direction of the two intake valves 3 (an example of the outer circumferential portion of a central portion in the arrangement direction) more protrudes in the direction of arrow A than an X1 side outer circumferential end portion 65b (an example of an outer circumferential portion at the end portion in the arrangement direction) and an X2 side outer circumferential end portion 65c (an example of an outer circumferential portion at the end of the arrangement direction). In addition, in the first embodiment, as illustrated in FIG. 5, the lower surface 63a is configured such that when the TCV 60 is closed, both the opening lengths L2 of an end opening K2 (an opening formed at the end side in the direction orthogonal to the arrangement direction and the intake air flow direction) and an end opening K3 (an opening formed at the end side in the direction orthogonal to the arrangement direction and the intake air flow direction), which are formed respectively in the outer circumferential end portion 65b and the outer circumferential end portion 65c in the direction of arrow B, are longer than an opening length L1 of a center opening K1 (an opening formed in the central portion in the direction orthogonal to the arrangement direction and the intake air flow direction), which is formed in the outer circumferential central portion 65a in the direction of arrow B that is orthogonal to the X-axis direction and the direction of arrow A (an example of the direction orthogonal to the arrangement direction and the intake air flow direction). In addition, FIG. 5 is a view illustrating a cross-sectional portion taken along line 150-150 in FIG. 2, which is viewed in the direction of arrow A. In addition, the center opening K1, the end opening K2, and the end opening K3 are interconnected in the X-axis direction to form a single opening 80a.

in addition, in the first embodiment, as described above, the intake apparatus 50 is configured such that the center opening K1 and the end openings K2 and K3 are formed by the lower outer circumferential portion 65 of the valve body 63 and a lower inner surface 81 of the intake passage 80 when the TCV 60 (the valve body 63) is closed (at the state of the closing side). In addition, the lower inner surface 81 represents the Z2 side inner surface of each of the intake pipes 52a to 52d.

In addition, in the first embodiment, as illustrated in FIG. 5, when the valve body 63 is closed, the shape of the end opening K2 formed at the X1 side (at one side) with reference to the outer circumferential central portion 65a and the shape of the end opening K3 formed at the X2 side (at the other side) with reference to the outer circumferential central portion 65a are symmetrical to each other about the outer circumferential central portion 65a when viewed in the intake air flow direction (in the direction of arrow A). In addition, the variation from the opening length L1 to the opening length L2 is implemented in such a way in which each of the opening lengths gradually increase from the outer circumferential central portion 65a to the outer circumferential end portion 65b and the outer circumferential end portion 65c, respectively.

Therefore, when the valve body 63 (the TCV 60) is rotated from the fully opened state where the valve body 63 is accommodated in the valve body accommodating portion 53a (see FIG. 3) to the state where the valve body 63 is rotated to the closing side in the direction of arrow P2 (see FIG. 4) such that the lower outer circumferential portion 65 of the valve body 63 reduces the cross-sectional area of the flow path of the intake passage 80 (see FIG. 5), the intake air flow forms a flow as follows and is guided into the cylinder 11a (into the combustion chamber 6).

Specifically, when intake air circulates at the lower surface 63a side of the TCV 60 in the direction of arrow A in FIG. 2, the cross-sectional area of the flow path of the intake passage 80 in the outer circumferential portion 65 is reduced to form the opening 80a, as illustrated in FIG. 5. Therefore, as illustrated in FIG. 3, one intake air flow at the upstream side is divided into a flow of the end opening K2 side and a flow of the end opening K3 side by the convex shape in the lower side (in the direction of arrow Z2) of the outer circumferential central portion 65a. Thereafter, the flow of the end opening K2 side is smoothly delivered to the first port 7a side without directly colliding with the diverging wall 7c, and the flow at the end opening K3 side is smoothly delivered to the second port 7b side without directly colliding with the diverging wall 7c.

In addition, as illustrated in the left frame line of FIG. 6 (the first embodiment), intake air flowing along the downwardly inclined curved shape of the first port 7a is supplied into the cylinder 11a through a portion of the intake valve 3. Similarly, intake air flowing along the downwardly inclined curved shape of the second port 7b is supplied into the cylinder 11a through a portion of the intake valve 3. At this time, because the intake air at both sides is delivered into the cylinder 11a without disturbing the respective stream lines thereof (represented by thick dashed lines), strong descending air flows in the vertical direction (parallel flows in the direction of arrow Z2 (in the vertical direction)) are formed inside the cylinder 11a, In addition, as illustrated in FIG. 1, the descending air flow is returned upward by a top surface 1a of the piston 1 such that a strong tumble flow is formed (generated) inside the cylinder 11a. In addition, the flow pattern of intake air flows is also the same as that in the corresponding intake port 7 of any one of the other cylinders 11b to 11d.

Here, as a comparative example of the intake apparatus 50 having the TCV 60 of the first embodiment, the cross-sectional area of the flow path of the intake passage 80 is reduced using an intake flow control valve (not illustrated) that is configured with a valve body in which the lower outer circumferential portion 65 is not formed on the lower surface 63a. In addition, in the comparative example, unlike the configuration of arrangement of the TCV 60 (see FIG. 1), a case is assumed in which a valve body is located (accommodated) in the lower inner surface 81 side of the intake passage 80, and the downstream end of the valve body is rotated toward the upper inner surface 82 to reduce the cross-sectional area of the flow path of the intake passage 80.

In the case of the comparative example, in the state where the downstream end of the valve body is rotated upward to reduce the cross-sectional area of the flow path of the intake passage 80, because the lower outer circumferential portion 65 is not formed, an intake air flow is simply throttled at the position of the intake flow control valve, and is not divided into two flows as in the case where the TCV 60 is applied. Accordingly, one throttled intake air flow collides with the diverging wall 7c at the downstream side of the intake port 7 to be divided into two flows by the diverging wall 7c. At this time, as illustrated in the right frame line of FIG. 6 (the comparative example), the intake air flows rapidly divided by the diverging wall 7c flow along the downwardly inclined curved shape in each of the first port 7a and the second port 7b to be delivered into the cylinder 11a while disturbing the respective stream lines thereof (represented by thick dashed lines). Accordingly, within the cylinder 11a, each of the two intake air flows forms a shape that is widened toward the end thereof where the stream lines are spaced apart from each other to be diffused in the inclined direction, which hardly forms a descending air flow in the completely vertical direction. In addition, because the intake air flows are returned upward by the top surface 1a of the piston 1 in the cylinder 11a in the state where the intake air flows hardly form a descending air flow in the completely vertical direction unlike the case where the TCV 60 is applied (in the left rim of FIG. 6), a well-formed tumble flow having a longitudinal vortex shape is not formed in the cylinder 11a. Thus, the comparative example reproduces a state where a conversion efficiency from the intake air flow to the tumble flow is low. Accordingly, in the intake apparatus 50 having the TCV 60 of the first embodiment (see FIG. 1), it is possible to generate a stronger tumble flow in the cylinder 11a than in the comparative example.

In addition, a control map (not illustrated) configured to allow an air flow control to function by the TCV 60 is stored in advance in a memory area in the ECU. The opening degree of the TCV 60 corresponding to the operating state of the engine 100 is set in the control map. As the actuator 70 is driven based on opening degree setting information referred to in the control map, the attitude of the valve body 63 is controlled. In addition, the detailed attitude control of the valve body 63 is repeated as the opening degree information of the valve body 63 obtained at the ECU side is fed back to the control of driving. In addition, when the engine 100 is operated in a relatively low speed zone and in the relatively low load state, the valve body 63 is controlled to be in the closed state and intake air having a tumble flow is mixed with a fuel to be combusted. On the contrary, when the engine 100 is operated in a relatively high speed zone and in the relatively high load state, the valve body 63 is controlled to be in the opened state and intake air in which the rate of a tumble flow is reduced is mixed with a fuel to be combusted. In this way, the intake apparatus 50 in the engine 100 is configured.

(Effect of First Embodiment)

The first embodiment is capable of obtaining the following effects.

In the first embodiment, as described above, when the TCV 60 is closed, the opening lengths L2 of the end opening K2 and the end opening K3, which are formed in the direction of arrow B in the outer circumferential end portion 65b (the X1 side) and the outer circumferential end portion 65c (the X2 side), are longer than the opening length L1 of the center opening K1, which is formed in the direction of arrow B in the outer circumferential central portion 65a of the two intake valves 3 of the TCV 60. Therefore, even if the intake port 7 has a structure in which the intake port 7 diverges from a single state at the upstream side into the first port 7a and the second port 7b at the downstream side, intake air can be divided into two flows from the position at which the TCV 60 is closed because the opening 80a (an open area), which is formed between the TCV 60 and the lower inner surface 81 of the intake passage 80 at the upstream side of the portion where the intake port 7 (the intake passage 80) is divided into two ports, is configured to be narrow at the outer circumferential central portion 65a of the intake valve 3 and to be wide at the outer circumferential end portions 65b and 65c. Therefore, because each of two air flows, which is divided at a time when passing through the TCV 60, is respectively delivered into the first port 7a and the second port 7b without extremely disturbing the stream lines thereof to be guided into the cylinder 11a (the combustion chamber 6), air flows in the vertical direction (parallel flows in the vertical direction) can be easily formed in the cylinder 11a. As a result, in the engine 100 having the intake port 7, which includes two intake valves 3 per one cylinder 11a, it is possible to obtain a sufficient strength of a tumble flow (longitudinal vortex) formed in the cylinder 11a.

In addition, in the first embodiment, the intake apparatus 50 is configured such that the center opening K1 and the end openings K2 and K3 are formed by the lower outer circumferential portion 65 of the valve body 63 and the lower inner surface 81 of the intake passage 80 when the TCV 60 is closed. Thus, because the flow rate of intake air can be increased in the outer area near the lower inner surface 81 of the intake passage 80 (the area of the outer circumferential end portion 65b (the X1 side) and the outer circumferential end portion 65c (the X2 side) in the X-axis direction of the intake valve 3), even if the lower inner surface 81 of the intake passage 80 has the shape of an intake port (the shape of a curved pipe) to be downwardly curved toward the cylinder, the intake air flow, of which the flow rate is increased by the lower inner surface 81 of the intake passage 80 that configures the opening 80a, can be made to pass along the inner surface of the intake passage 80 inside the curved portion. Accordingly, the two intake air flows, which are divided at the downstream side thereof, may be guided into the cylinder 11a (into the combustion chamber 6) while cancelling a vortex flow of intake air caused due to the separation of fluid generated inside the curved portion. In this way, because the intake air flow, of which the flow rate is increased by the TCV 60, can be efficiently converted into a tumble flow (a longitudinal vortex), a strong tumble flow can be efficiently generated inside the cylinder 11a.

In addition, in the first embodiment, in the lower outer circumferential portion 65 of the valve body 63, the outer circumferential central portion 65a protrudes toward the lower inner surface 81 of the intake passage 80 more than the outer circumferential end portion 65b (the X1 side) and the outer circumferential end portion 65c (the X2 side). Thereby, when the valve is closed, the opening lengths L2 of the end opening K2 and the end opening K3 are longer than the opening length L1 of the center opening K1 in the direction of arrow B. Therefore, by optimally designing the shape of the TCV 60 (the shape of the lower outer circumferential portion 65 of the valve body 63 in the intake air flow direction (the direction of arrow A)), the intake apparatus 50, which is capable of efficiently obtaining a sufficient strength of a tumble flow formed inside the cylinder 11a of the engine 100, can be easily manufactured.

In addition, in the first embodiment, when the TCV valve 60 is closed, the shape of the end opening K2 formed at the X1 side with reference to the outer circumferential central portion 65a and the shape of the end opening K3 formed at the X2 side with reference to the outer circumferential central portion 65a are symmetrical to each other at the X1 side and the X2 side about the outer circumferential central portion 65a when viewed in the flow direction of the intake air flow. Therefore, one intake air flow at the upstream side may be divided bilaterally symmetrical from the center of the X-axis direction in the lower outer circumferential portion 65. Accordingly, because the equally divided intake air flows may be supplied respectively to the first port 7a and the second port 7b, a descending air flow (tumble flow), which is not deflected in the circumferential direction, can be formed even within the cylinder 11a.

In addition, in the first embodiment, when the TCV 60 is closed, the variation from the opening length L1 to the opening length L2 is implemented in such a way in which the opening lengths gradually increase from the outer circumferential central portion 65a to the outer circumferential end portion 65b (the X1 side) and the outer circumferential end portion 65c (the X2 side), respectively. Therefore, intake air can be divided into two flows in the lower outer circumferential portion 65 in the state where the resistance of the flow path due to the uneven shape of the lower outer circumferential portion 65 is suppressed as much as possible when one intake air flow passes through the lower surface 63a of the valve body 63. Accordingly, the intake air flows can be easily supplied toward the first port 7a and the second port 7b, respectively, without disturbing the flow.

[Modification of First Embodiment]

A modification of the first embodiment will be described below with reference to FIGS. 5 and 7. In the modification of the first embodiment, descriptions will be made on an example in which the shape of a valve body 163 is formed such that an outer circumferential central portion 165a (the outer circumferential portion of a central portion in the arrangement direction) of a lower outer circumferential portion 165 of a TCV 160 (see FIG. 7) is substantially in contact with the lower inner surface 81 of the intake passage 80.

That is, as illustrated in FIG. 7, the valve body 163 of the TCV 160 (an example of the intake flow control valve) includes the lower outer circumferential portion 165 that is formed to have the outer circumferential central portion 165a, an outer circumferential end portion 165b, and an outer circumferential end portion 165c. In addition, when the TCV 160 (the valve body 163) is closed, the protrusion amount of the outer circumferential central portion 165a to the lower inner surface 81 is increased compared to that in the TCV 60 (see FIG. 5). In this case, the outer circumferential central portion 165a of the lower circumferential portion 165 is formed to be substantially in contact with the lower inner surface 81. Thus, the opening length L1 of the center opening K1 is almost zero. In addition, the end opening K2 having the opening length L2 is formed at the X1 side and the end opening K3 having the opening length L2 is formed at the X2 side about the outer circumferential central portion 165a. Thus, in the modification of the first embodiment, a single opening 180a is formed in which the center opening K1, the end opening K2, and the end opening K3 are interconnected in the X-axis direction in the state where the opening length L1 of the center opening K1 is almost zero. In addition, other configurations in the modification of the first embodiment are the same as those in the first embodiment.

(Effect of Modification of First Embodiment)

In a modification of the first embodiment, as described above, the valve body 163 is formed such that the outer circumferential central portion 165a of the lower outer circumferential portion 165 of the TCV 160 is substantially in contact with the lower inner surface 81 of the intake passage 80. Therefore, because the end opening K2 having the opening length L2 and the end opening K3 having the opening length L2 are reliably formed respectively at the X1 side and the X2 side with the outer circumferential central portion 165a as a boundary, one intake air flow at the upstream side may be reliably divided into a flow at the end opening K2 side and a flow at the end opening K3 side by the convex shape in the lower side of the outer circumferential central portion 165a. Accordingly, the flow at the end opening K2 side and the flow at the end opening K3 side may be reliably separated from each other before the intake port 7 is divided into the first port 7a and the second port 7b. Accordingly, a sufficient strength of a tumble flow formed in the cylinder 11a can be obtained. In addition, other effects of the modification of the first embodiment are the same as those in the first embodiment.

[Second Embodiment]

A second embodiment will be described below with reference to FIGS. 2, 3 and 8. The second embodiment illustrates an example in which the shape of a lower inner surface 281 of an intake passage 280 is changed to form the shape of an opening 280a (see FIG. 8). In addition, in the drawings, the same elements as those of the first embodiment are denoted by the same reference numerals.

An engine (not illustrated) according to the second embodiment includes an intake apparatus 250 (an intake apparatus of an internal combustion engine). In addition, as illustrated in FIG. 8, in the intake apparatus 250, a TCV 260

(an example of an intake flow control valve) is individually inserted into an intake pipe unit 252 (into each of the intake pipes 52a to 52d).

Here, in the second embodiment, each TCV 260 includes a valve body 263 in which a lower outer circumferential portion 265 linearly extends in the X-axis direction even when the TCV 260 is closed. That is, an outer circumferential central portion 265a (the outer circumferential portion of a central portion in the arrangement direction), an outer circumferential end portion 265b (at the X1 side) (the outer circumferential portion of an end portion in the arrangement direction) and an outer circumferential end portion 265c (at the X2 side) (the outer circumferential portion of an end portion in the arrangement direction) are located at the same height in the direction of arrow B. Meanwhile, when the valve is closed, the lower inner surface 281 of the intake passage 280, which is opposite to the lower outer circumferential portion 265 of the valve body 263, is raised from the central portion in the X-axis direction toward the lower outer circumferential portion 265.

Specifically, an inner surface central portion 281a that is opposite to the outer circumferential central portion 265a in the X-axis direction (an example of an inner surface portion opposite to the central portion in the arrangement direction) protrudes toward a lower surface 263a of the valve body 263 more than an inner surface end 281b that is opposite to the outer circumferential end portion 265b in the X-axis direction (an inner surface portion opposite to the end portion in the arrangement direction) and an inner surface end 281c that is opposite to the outer circumferential end portion 265c (an inner surface portion opposite to the end portion in the arrangement direction). Therefore, when the valve is closed, the opening lengths L2 of the end opening K2 and the end opening K3, which are formed in the direction of arrow B in the outer circumferential end portion 265b at the X1 side and the outer circumferential end portion 265c at the X2 side, are longer than the opening length L1 of the center opening K1, which is formed in the direction of arrow B, which is orthogonal to the X-axis direction and the direction of arrow A (intake air flow direction), in the outer circumferential central portion 265a. In addition, in the second embodiment, the shape of the end opening K2 that is formed at the X1 side with reference to the outer circumferential central portion 265a and the shape of the end opening K3 that is formed at the X2 side with reference to the outer circumferential central portion 265a are symmetrical to each other about the outer circumferential central portion 265a when viewed in the flow direction of intake air flow (viewing in the direction of arrow A). In addition, the variation from the opening length L1 to the opening length L2 is implemented in such a way in which the opening lengths gradually increase from the outer circumferential central portion 265a to the outer circumferential end portion 265b and the outer circumferential end portion 265c, respectively.

Accordingly, one intake air flow at the upstream side is divided into a flow at the end opening K2 side and a flow at the end opening K3 side by the upwardly (in the direction of arrow Z1) convex shape of the inner surface central portion 281a of the lower inner surface 281 of the intake passage 280 that corresponds to (is opposite to) the outer circumferential central portion 265a. Thereafter, the flow at the end opening K2 side is smoothly delivered to the first port 7a (see FIG. 3) side without directly colliding with the diverging wall 7c (see FIG. 3), and the flow at the end opening K3 side is smoothly delivered to the second port 7b (see FIG. 3) side without directly colliding with the diverging wall 7c. Accordingly, similarly to the case of the first embodiment, the intake air flowing along the downwardly inclined curved shape of the first port 7a is supplied into the cylinder 11a (see FIG. 3) through a portion of the intake valve 3 (see FIG. 3). Similarly, the intake air flowing along the downwardly inclined curved shape of the second port 7b is supplied into the cylinder 11a through a portion of the intake valve 3. At this time, because the intake air at both sides is delivered into the cylinder 11a without disturbing the respective stream lines thereof (represented by thick dashed lines), strong descending air flows in the vertical direction (parallel flows in the arrow Z2 direction (in the vertical direction)) are formed within the cylinder 11a. In addition, as illustrated in FIG. 2, the descending air flow is returned upwardly by the top surface 1a of the piston 1, thereby forming a strong tumble flow within the cylinder 11a. Other configurations of the intake apparatus 250 according to the second embodiment are the same as those of the first embodiment.

(Effects of Second Embodiment)

In the second embodiment, the following effects can be obtained.

In the second embodiment, as described above, when the TCV 260 is closed, the opening lengths L2 of the end opening K2 and the end opening K3, which are formed in the direction of arrow B in the outer circumferential end portion 265b and the outer circumferential end portion 265c, are longer than the opening length L1 of the center opening K1, which is formed in the direction of arrow B in the outer circumferential central portion 265a of the two intake valves 3 of the TCV 60. Therefore, even if the intake port 7 diverges from a single state at the upstream side into the first port 7a and the second port 7b at the downstream side, the intake air may be divided into two flows from the position at which the TCV 260 is closed as a starting point because the opening 280a, which is formed between the TCV 260 and the lower inner surface 281 of the intake passage 280 at the upstream side of the portion at which the intake port 7 diverges into two ports, is formed to be narrow at the outer circumferential central portion 265a of the intake valve 3 and to be wide at the outer circumferential end portions 265b and 265c. Therefore, because two intake air flows, which are divided at the time when passing through the TCV 260, are respectively delivered into the first port 7a and the second port 7b without disturbing the stream lines thereof to be guided into the cylinder 11a (the combustion chamber 6), an air flow in the vertical direction can be easily formed in the cylinder 11a. As a result, a sufficient strength of a tumble flow formed in the cylinder 11a can be obtained.

In addition, in the second embodiment, in the lower inner surface 281 of the intake passage 280, the inner surface central portion 281a, which is opposite to the outer circumferential central portion 265a, protrudes toward the lower surface 263a of the valve body 263 more than the inner surface end 281b, which is opposite to the outer circumferential end portion 265b (the X1 side), and the inner surface end 281c, which is opposite to the outer circumferential end portion 265c (the X2 side). Therefore, when the valve is closed, the opening lengths L2 of the end opening K2 and the end opening K3 are longer than the opening length L1 of the center opening K1 in the direction of arrow B. Accordingly, by optimally designing the shape of the inner surface 281 of the intake passage 280 in the intake air flow direction, the intake apparatus 250, which is capable of efficiently obtaining a sufficient strength of a tumble flow formed inside the cylinder 11a of the engine, can be easily manufactured. Other effects of the second embodiment are the same as those of the first embodiment.

[Modification]

It shall be considered that the embodiment disclosed here is given by way of example and is not limitative in all terms. The scope of the present invention is defined by the appended claims, rather than the description of the embodiments, and includes all modifications (modifications) that are equivalent to and fall within the scope of the appended claims.

For example, in the first embodiment and the modification thereof, the lower outer circumferential portion 65 (165) is configured to have curvilinear edge portions from the outer circumferential central portion 65*a* (165*a*) to the outer circumferential end portion 65*b* (165*b*) and the outer circumferential end portion 65*c* (165*c*) in the first embodiment and the modification thereof, but the present invention is not limited thereto. For example, the lower outer circumferential portion 65 (165) may be formed to be linearly inclined from the outer circumferential central portion 65*a* (165*a*) to the outer circumferential end portion 65*b* (165*b*) or 65*c* (165*c*), or may be formed to increase the opening length in a stepped form.

In addition, in the second embodiment, the lower inner surface 281 is configured with a curvilinear lower surface from the inner surface central portion 281*a* to the outer circumferential end portion 265*b* or 265*c* of the lower inner surface 281, but the present invention is not limited thereto. For example, the lower inner surface 281 may be formed to be linearly inclined from the inner surface central portion 281*a* to the outer circumferential end portion 265*b* or 265*c*, or may be formed to increase the opening length in a stepped form.

In addition, in the modification of the first embodiment, the shape of the valve body 163 is formed such that the outer circumferential central portion 165*a* of the lower outer circumferential portion 165 is substantially in contact with the lower inner surface 81, but the present invention is not limited thereto. That is, when the valve is closed, the outer circumferential central portion 165*a* may completely come into contact with the lower inner surface 81 such that the opening length L1 is zero.

In addition, in the second embodiment, the inner surface central portion 281*a* of the lower inner surface 281 of the intake passage 280 is configured to have the center opening K1 and to be brought close to the outer circumferential central portion 265*a* of the TCV 260, but the present invention is not limited thereto. That is, when the valve is closed, the inner surface central portion 281*a* may have a slight gap with the outer circumferential central portion 265*a* (the opening length L1 is near zero), or may be completely in contact with the outer circumferential central portion 265*a* so that the opening length L1 becomes zero.

In addition, in the modification of the first embodiment, the outer circumferential central portion 165*a* of the lower outer circumferential portion 165 is configured to substantially in contact with the central portion of the lower inner surface 81, but the present invention is not limited thereto. For example, the lower outer circumferential portion 165 may be formed in such a way in which the outer circumferential central portion 165*a*, which protrudes toward the lower inner surface 81, is extended by a predetermined distance from the center of the intake port 7 to the X1 side and the X2 side while maintaining the opening length L1, and the opening length is increased from the position, to which the outer circumferential central portion 165*a* is extended by the predetermined length, toward the outer circumferential end portion 165*b* and the outer circumferential end portion 165*c*.

In addition, the first embodiment, the modification of the first embodiment, and the second embodiment apply the TCV 60 (160 or 260) to each of the intake pipes 52*a* to 52*d* (the intake passage 80) that have of which the flow path cross section has a laterally long shape along the X-axis direction, but the present invention is not limited thereto. The intake flow control valve according to the present invention may be applied to an intake passage that has a circular or oval flow path cross section.

In addition, in the first embodiment, the modification of the first embodiment, and the second embodiment, the TCV 60 (160 or 260) is configured by using a resin valve body 63 (163 or 263), but the present invention is not limited thereto. The TCV 60 may be configured by using a metal valve body 63. That is, the lower outer circumferential portion 65 may be formed on the lower surface 63*a* of the valve body 63 by performing a metal processing.

In addition, in the first embodiment, the modification of the first embodiment, and the second embodiment, the present invention is applied to the TCV 60 (160 or 260) which has a U-shaped cross-sectional shape when viewed along the intake air flow direction, but the present invention is not limited thereto. The present invention may be applied to an intake apparatus in which an intake flow control valve including a rotating shaft on the root portion of a valve body having a flat plate shape such that a downstream end side is rotated in intake air flow, or a butterfly type intake flow control valve are rotatably incorporated.

In addition, the first embodiment, the modification of the first embodiment, and the second embodiment illustrate an example in which the intake apparatus 50 or 250 is applied to the serial four-cylinder type engine 100, but the present invention is not limited thereto. The intake apparatus of the internal combustion engine according to the present invention may be applied to, for example, a multi-cylinder engine or a V-shaped multi-cylinder engine other than the serial four-cylinder engine. In addition, the present invention may be applied to an intake apparatus of a single cylinder engine. In addition, the present invention may be applied to an intake apparatus of an internal combustion engine, which is mounted in, for example, facility equipment, rather than a vehicle. In addition, as the internal combustion engine, the present invention may be applied to any one of a gasoline engine, a diesel engine, a gas engine, and the like.

An intake apparatus of an internal combustion engine disclosed here includes an intake passage, which communicates with a combustion chamber of the internal combustion engine having two intake valves per cylinder and supplies intake air to the combustion chamber, and an intake flow control valve, which is installed in the intake passage and controls a flow of intake air by an opening that is formed between a valve body and an inner surface of the intake passage via rotation of the valve body when the valve is closed. The intake apparatus is configured such that when the intake flow control valve is closed, the opening length of the opening, which is formed at an end side in an arrangement direction of the two intake valves in a direction orthogonal to the arrangement direction and an intake air flow direction, is longer than the opening length of an opening, which is formed at a central portion of the intake flow control valve in the arrangement direction in the direction orthogonal to the arrangement direction and the intake air flow direction. Here, in this disclosure, the opening length of the opening, which is formed at the central portion in the arrangement direction of the two intake valves of the intake flow control valve in the direction orthogonal to the arrangement direction and the intake air flow direction has a wide concept that covers the length of a slight gap near zero. In addition, in this disclosure, the central portion in the arrangement direction of the two intake valves has a wide concept that covers not only a perfect center position, but also a center region that has a predetermined width in the arrangement direction including the center position.

In the intake apparatus of the internal combustion engine disclosed here, as described above, when the intake flow control valve is closed, the opening length of the opening, which is formed at the end side in the arrangement direction of the two intake valves in the direction orthogonal to the arrangement direction and the intake air flow direction, is longer than the opening length of the opening, which is formed at the central portion of the intake flow control valve in the arrangement direction in the direction orthogonal to the arrangement direction and the intake air flow direction. Therefore, even if the intake flow control valve has a structure in which one intake port (head port) at the upstream side diverges into two ports at the downstream side, the intake air can be divided into two flows from the position at which the intake flow control valve is closed because the opening, which is formed between the intake flow control valve and the inner surface of the intake passage at the upstream side of the portion at which the intake port (the intake passage) is divided into two ports, is configured to be narrow at the central portion in the arrangement direction of the intake valves and to be wide at the end sides. Therefore, because the two intake air flows, which are divided at the time when passing through the intake flow control valve, are respectively delivered into the two diverging ports in the downstream side without extremely disturbing the stream lines thereof to be guided into a cylinder (the combustion chamber), air flows in the vertical direction (parallel flows in the vertical direction) can be easily formed in the cylinder. As a result, in the internal combustion engine having the intake port, which includes two intake valves per cylinder, a sufficient strength of a tumble flow (longitudinal vortex) formed in the cylinder can be obtained.

The intake apparatus of the internal combustion engine disclosed here may be configured in such a way in which, when the intake flow control valve is closed, the opening is formed by the lower outer circumferential portion of the valve body and the lower inner surface of the intake passage.

With this configuration, because it is possible to increase the flow rate of intake air in the outer area near the lower inner surface of the intake passage (the area of the end side in the arrangement direction of the intake valves), the intake air flow, of which the flow rate is increased by the lower inner surface of the intake passage that configures the opening, is allowed to pass along the inner surface of the intake passage inside the curved portion even if the lower inner surface of the intake passage has the shape of the intake port (the shape of a curved pipe) to be downwardly curved toward the cylinder. Accordingly, the two intake air flows, which are divided at the downstream side thereof, may be guided into the cylinder (into the combustion chamber) while cancelling a vortex flow of intake air caused due to the separation of fluid generated inside the curved portion. In this way, because the intake air flow, of which the flow rate is increased by the intake flow control valve, can be efficiently converted into a tumble flow (a longitudinal vortex), a strong tumble flow can be efficiently generated within the cylinder.

In the configuration in which the opening is formed by the lower outer circumferential portion of the valve body and the lower inner surface of the intake passage, in the lower outer circumferential portion of the valve body, the outer circumferential portion of the central portion in the arrangement direction protrudes toward the lower inner surface of the intake passage more than the outer circumferential portion of the end side in the arrangement direction. Therefore, the configuration may be made in such a way in which, when the valve is closed, the opening length of the opening, which is formed at the end side in the arrangement direction in the direction orthogonal to the arrangement direction and the intake air flow direction, is longer than the opening length of the opening, which is formed at the central portion in the arrangement direction in the direction orthogonal to the arrangement direction and the intake air flow direction.

With this configuration, by optimally designing the shape of the intake flow control valve (the shape of the lower outer circumferential portion of the valve body in the intake air flow direction), the intake apparatus, which is capable of efficiently obtaining a sufficient strength of a tumble flow formed inside the cylinder of the internal combustion engine, can be easily manufactured.

In the configuration in which the opening is formed by the lower outer circumferential portion of the valve body and the lower inner surface of the intake passage, among the lower inner surface of the intake passage, the inner surface portion, which is opposite to the central portion in the arrangement direction, protrudes toward the lower surface of the valve body more than the inner surface portion, which is opposite to the end portion in the arrangement direction. Therefore, the configuration may be made in such a way in which, when the valve is closed, the opening length of the opening, which is formed in the end side in the arrangement direction in the direction orthogonal to the arrangement direction and the intake air flow direction, is longer than the opening length of the opening, which is formed in the central portion in the arrangement direction in the direction orthogonal to the arrangement direction and the intake air flow direction.

With this configuration, by optimally designing the shape of the intake passage (the shape of the lower inner surface of the intake passage in the intake air flow direction), the intake apparatus, which is capable of efficiently obtaining a sufficient strength of a tumble flow formed inside the cylinder of the internal combustion engine, can be easily manufactured.

In the configuration in which the opening is formed by the lower outer circumferential portion of the valve body and the lower inner surface of the intake passage, among the lower inner surface of the intake passage, the inner surface portion, which is opposite to the central portion of the intake flow control valve in the axial direction, protrudes toward the lower surface of the valve body more than the inner surface portion, which is opposite to the end portion in the arrangement direction. Therefore, the configuration may be made in such a way in which, when the intake flow control valve is closed, the shape of an opening formed at one side of the central portion in the arrangement direction, and the shape of an opening formed at the other side of the central portion in the arrangement direction are symmetrical to each other about the central portion in the arrangement direction when viewed in the intake air flow direction.

With this configuration, a formed tumble flow can be evenly distributed to respective cylinders of the internal combustion engine.

In the configuration in which the opening is formed by the lower outer circumferential portion of the valve body and the lower inner surface of the intake passage, the configuration may be made in such a way in which, when the intake flow control valve is closed, the opening length of the opening gradually increases from the central portion in the arrangement direction to the end side in the arrangement direction.

With this configuration, a sufficient strength of a tumble flow formed in each cylinder of the internal combustion engine can be efficiently obtained.

Another intake flow control valve disclosed here includes: a valve body, which is installed in an intake passage that supplies intake air to a combustion chamber of an internal combustion engine having two intake valves per cylinder, and controls the flow of intake air by forming an opening between the valve body and an inner surface of the intake passage; and a rotating shaft that rotates the valve body in the intake passage. In a lower outer circumferential portion of the valve body, an outer circumferential portion of a central portion of the valve body in an arrangement direction of the two intake valves protrudes toward a lower inner surface of the intake passage more than an outer circumferential portion of an end side in the arrangement direction. Therefore, when the valve is closed, an opening length of the opening, which is formed at the end portion in the arrangement direction in a direction orthogonal to the arrangement direction and an intake air flow direction, is longer than an opening length of the opening, which is formed at the central portion in the arrangement direction in the direction orthogonal to the arrangement direction and the intake air flow direction.

In the intake flow control valve, even if an intake port has a structure in which the intake port (head port) diverges from one at the upstream side into two at the downstream side, the intake air can be divided into two flows from the position at which the valve body is closed because an opening, which is formed between the valve body and the inner surface of the intake passage at the upstream side of the portion at which the intake port (the intake passage) is divided into two ports, is configured to be narrow at the central portion of the arrangement direction of the intake valves and to be wide at the end side. Therefore, because the two intake air flows, which are divided at the time when passing through the valve body, are respectively delivered into the two diverging ports at the downstream side without extremely disturbing the stream lines thereof to be guided into a cylinder (the combustion chamber), air flows in the vertical direction (parallel flows in the vertical direction) can be easily formed in the cylinder. As a result, in the internal combustion engine having the intake port, which includes two intake valves per cylinder, a sufficient strength of a tumble flow (longitudinal vortex) formed in the cylinder can be obtained.

Although the present invention has been described based on the embodiments, the present invention is not limited to the configuration described in the embodiments, and may employ various forms within the scope defined in the appended claims.

The invention claimed is:

1. An intake apparatus of an internal combustion engine, the intake apparatus comprising:
   an intake passage configured to communicate with a combustion chamber of an internal combustion engine having two intake valves per cylinder and supply intake air to the combustion chamber; and
   an intake flow control valve installed in the intake passage and configured to control a flow of intake air by an opening formed between a valve body and an inner surface of the intake passage when the valve is closed as the valve body is rotated,
   wherein, when the intake flow control valve is closed, a portion of the opening which is formed at an end side of the intake flow control valve relative to an arrangement direction of the two intake valves has an opening length, in a direction orthogonal to the arrangement direction and an intake air flow direction, which is longer than an opening length, in the direction orthogonal to the arrangement direction and the intake air flow direction, of a portion of the opening which is formed at a central portion of the intake flow control valve relative to the arrangement direction,
   wherein, when the intake flow control valve is closed, the opening is formed by a lower outer circumferential portion of the valve body and a lower inner surface of the intake passage.

2. The intake apparatus of an internal combustion engine according to claim 1, wherein, in the lower outer circumferential portion of the valve body, an outer circumferential portion of the central portion protrudes toward the lower inner surface of the intake passage more than an outer circumferential portion of an end portion.

3. The intake apparatus of an internal combustion engine according to claim 1, wherein, in the lower inner surface of the intake passage, an inner surface portion, which is opposite to the central portion, protrudes toward a lower surface of the valve body more than an inner surface portion, which is opposite to the end portion.

4. The intake apparatus of an internal combustion engine according to claim 3, wherein, when the valve body is closed, a shape of the opening formed at one side with reference to the central portion and a shape of the opening formed at another side with reference to the central portion are symmetrical to each other about the central portion when viewed in the flow direction of intake air.

5. The intake apparatus of an internal combustion engine according to claim 4, wherein, when the valve body is closed, the opening length of the opening is increased from the central portion toward the end side.

6. An intake flow control valve of an internal combustion engine comprising:
   a valve body which is installed in an intake passage that supplies intake air to a combustion chamber of an internal combustion engine having two intake valves per cylinder and configured to control a flow of intake air by forming an opening between the valve body and an inner surface of the intake passage; and
   a rotating shaft that rotates the valve body in the intake passage,
   wherein, in a lower outer circumferential portion of the valve body, an outer circumferential portion of a central portion of the valve body relative to an arrangement direction of the two intake valves protrudes toward a lower inner surface of the intake passage more than an outer circumferential portion of an end portion of the valve body relative to the arrangement direction such that, when the valve is closed, a portion of the opening which is formed at the end portion of the valve body has an opening length, in a direction orthogonal to the arrangement direction and an intake air flow direction, which is longer than an opening length, in the direction orthogonal to the arrangement direction and the intake air flow direction, of a portion of the opening which is formed at the central portion of the valve body,
   wherein, when the intake flow control valve is closed, the opening is formed by a lower outer circumferential portion of the valve body and a lower inner surface of the intake passage.

* * * * *